3,236,839
**5α-PREGNANO-[3,2-c]PYRAZOLE AND THE
16α,17α-ACETONIDE THEREOF**
Paul Buchschacher, Plainfield, and Ralph F. Hirschmann,
  Scotch Plains, N.J., assignors to Merck & Co. Inc.,
  Rahway, N.J., a corporation of New Jersey
No Drawing. Filed Oct. 26, 1962, Ser. No. 233,471
              15 Claims. (Cl. 260—239.5)

This invention is concerned generally with novel steroids and with processes of preparing the same. More particularly it relates to novel 21-hydroxy-, 21-acyloxy-, 21-desoxy-, 21-chloro-, and 21-fluoro-16α,17α-dihydroxy-20-oxo-5α-pregnano-[3,2-c]pyrazole compounds and to the 16α,17α-acetals and ketals of these [3,2-c]pyrazoles.

The novel compounds which form the subject of the present invention have structural Formulas A and B.

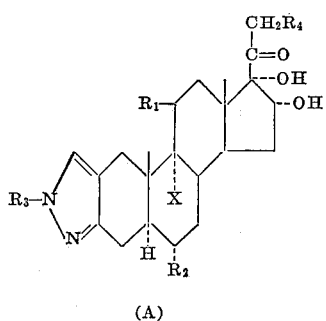

(A)

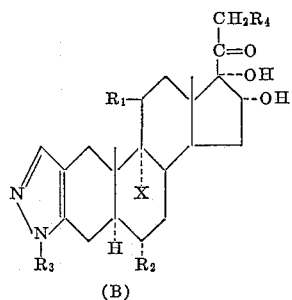

(B)

wherein $R_1$ is β-halogen, β-hydroxy, hydrogen or keto, but β-halogen is present at $R_1$ only when X is halogen, $R_2$ is hydrogen, methyl, fluoro or chloro and $R_4$ refers to hydrogen, chloro, fluoro, hydroxy, acyloxy, the dihydrogen phosphate, and the alkali metal salts of the dihydrogen phosphate, $R_3$ is hydrogen, acyl, alkyl, aralkyl, cycloalkyl, aryl, a heterocyclic nucleus, or substituted derivatives thereof, X refers to hydrogen, chloro or fluoro.

The 16α,17α-acetals and ketals of the above compounds which are also included in the present invention have the following structures:

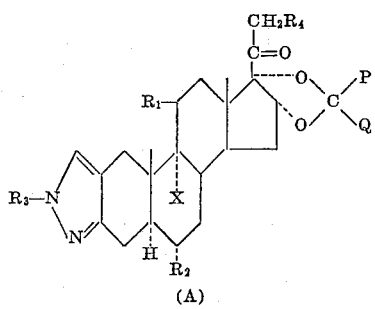

(A)

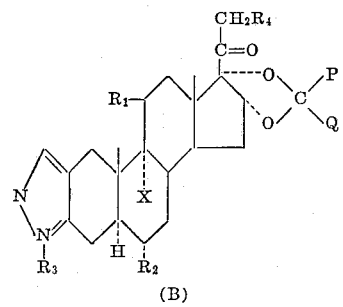

(B)

wherein $R_1$, $R_2$, $R_3$, $R_4$ and X have the meaning above defined and wherein P and Q are each selected from the group consisting of hydrogen, alkyl and aryl, and together with the carbon to which they are joined, P and Q are cycloalkyl.

The above defined [3,2-c]pyrazole-steroids possess high anti-inflammatory activity and are especially effective as topical agents and for the treatment of arthritis and related diseases since they can be administered for their cortisone-like action in low dosage thereby minimizing undesirable side effects.

In preparing our novel chemical compounds, a 16α,17α-dihydroxy-4-pregnene-3,20-dione having a protected side chain is hydrogenated to form the corresponding 16α,17α-dihydroxy-5α-pregnane-3,20 - dione compound. In a preferred embodiment of my invention, the 4-pregnene is hydrogenated catalytically using 5% Pd/BaSO₄ as catalyst, at room temperature and a hydrogen pressure of about 30 pounds p.s.i. The product formed is predominantly the 5α-pregnane (AB trans), but mixtures of 5α and 5β-pregnanes are often obtained. The 5α-pregnane may be separated, if necessary, by chromatography and crystallization.

Among the compounds which may be used as starting materials of our invention following the procedure of Flow Sheet A are:

11β,17α,21-trihydroxy-4-pregnene-3,20-dione, 6α-chloro-
  11β,17α,21-trihydroxy-4-pregnene-3,20-dione,
6α-fluoro-11β,17α,21-trihydroxy-4-pregnene-3,20-dione,
11β,17α,21-trihydroxy-6α-methyl-4-pregnene-
  3,20-dione,
9α-fluoro-11β,17α,21-trihydroxy-4-pregnene-3,20-dione,
6α-chloro-9α-fluoro-11β,17α,21-trihydroxy-4-pregnene-
  3,20-dione,
6α,9α-difluoro-11β,17α,21-trihydroxy-4-pregnene-3,20-
  dione,
11β,17α,21-trihydroxy-9α-fluoro-6α-methyl-4-pregnene-
  3,20-dione, and the 11-desoxy analogs thereof.

Upon treatment of the 16α,17α-dihydroxy-5α-pregnane-3,20-dione, having a protected side chain, with an alkyl formate and sodium hydride in an inert atmosphere there is formed the corresponding 2-hydroxymethylene derivative. The 2-hydroxymethylene derivative is designated on Flow Sheet A as compound 9 and on Flow Sheet B as compound 19. In a preferred embodiment of our invention, the steroid is dissolved in a solvent such as benzene or pyridine and the resulting solution is cooled to room temperature and treated with ethyl formate. The air in the system is replaced with nitrogen, sodium hydride or alkoxide is added and the mixture is stirred at room temperature for several hours.

The 2-hydroxymethylene compound and/or its derived formates reacts with hydrazine in an inert atmosphere to form the corresponding [3,2-c]pyrazole.

Upon treatment of the 2-hydroxymethylene- compound with a lower alkanol in the presence of an acidic reagent such as p-toluenesulfonic acid the corresponding 2-alkoxymethylene-compound is formed. When the hydroxymethylene compound containing variable amounts of the alkoxymethylene derivative is reacted with a monosubstituted hydrazine, the following N-substituted [3,2-c]pyrazole derivatives are formed,

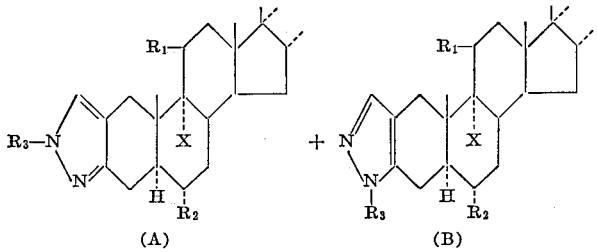

wherein $R_1$, $R_2$, $R_3$ and X have the significance above defined.

The above compounds are shown on Flow Sheet A as compounds 10A and 10B, and on Flow Sheet B as compounds 20A and 20B. The mixture of products may be separated by chromatography. The N-substituted-[3,2-c]pyrazoles having structure A are designated as the 1'-substituted-[3,2-c]pyrazoles and the N-substituted compounds having structure B are designated as the 2'-substituted [3,2-c]pyrazoles.

Upon treatment of a 2-hydroxymethylene-compound directly with a monosubstituted arylhydrazine, without the intermediate formation of the 2-alkoxy-methylene-derivative, one isomer is generally formed in preponderant amounts, whereas when reacting the 2-alkoxymethylene-compound with a monosubstituted arylhydrazine, significant amounts of both isomers are obtained. When these reactions take place with monosubstituted-alkylhydrazines, mixtures may be obtained when starting with the 2-hydroxymethylene-steroid as well as with the 2-alkoxymethylene-steroid. A mixture of isomers may also result from the reaction of a monosubstituted-hydrazine with a 2-hydroxymethylene-compound which possibly contains variable amounts of the 2-alkoxymethylene-compound due to the operating procedures employed, for example, due to recrystallization in the presence of a trace of alcohol a solution of the 2-hydroxymethylene compound from which acid has not been completely removed.

Any formate ester groups present in the resulting [3,2-c]pyrazole may be removed by refluxing the steroid for about 2 hours with a mixture of potassium hydroxide in ethanol.

Among the monosubstituted hydrazines which may be used for the process of our invention are: alkylhydrazines, such as methylhydrazine, ethylhydrazine, propylhydrazines, butylhydrazines, β-hydroxyethylhydrazine; cycloalkylhydrazines; monosubstituted-hydrazines which may be derived from an aromatic or heterocyclic ring nucleus including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene; 2-hydrazinopyridine, 3-hydrazinopyridine, 4-hydrazinopyridine, 2-hydrazinothiophene, 3-hydrazinothiophene, 4-hydrazinopyridine oxide, and 2-hydrazinopyrimidine; aralkylhydrazines, such as benzylhydrazine and phenylethylenehydrazine.

There are thus produced the corresponding N-substituted-[3,2-c]pyrazoles including: N-alkyl such as N-methyl-, N-ethyl-, N-butyl-, N-propyl-, N-(β-hydroxyethyl)-, N-cycloalkyl-, N-substituted derivatives which may be derived from any aromatic or heterocyclic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-(4''-pyridyl)-, N(4''-pyridyl oxide)-, N-(2''-pyrimidyl)-; N-(2''-thiophene)-, N-(3''-thiophene)-; N- aralkyl-, such as N-benzyl- and N-phenylethenyl-[3,2-c]pyrazoles.

The N-alkyl-[3,2-c]pyrazoles may also be prepared by direct alkylation of the N-unsubstituted-[3,2-c]pyrazoles.

The side chain of the steroid may be protected with an ethylenedioxy group at carbon-20, and an acyl group at carbon-21 as shown in compound 6 of Flow Sheet A, and compound 31 of Flow Sheet C. The side chain may also be protected by forming the 16α,17α-acetal or ketal, together with a tetrahydropyranyl group at carbon-21, as shown in compound 17 of Flow Sheet "B."

The 20-ethylenedioxy-21-acylate is prepared from the known 17α,21-dihydroxy-4-pregnene-3,20-dione as indicated on Flow Sheets A and C, detailed procedures for which are given in Examples 1 and 3.

In Flow Sheet A an 11-keto group (compounds 10A and 10B) is reduced to the 11β-hydroxy group (compounds 11A and 11B) using sodium borohydride. To obtain the 11-keto-compound this reduction step with sodium borohydride is omitted. The 20-ethylenedioxy group is removed by heating the steroid, dissolved in a solvent such as methanol, with aqueous sulfuric acid.

The 16α,17α-dihydroxy-steroid is converted into the 16α,17α-acetal or ketal by treating with a carbonyl reactant of the general formula:

wherein P and Q are each selected from the group consisting of hydrogen, alkyl, and aryl, and together with the carbon to which they are joined, P and Q are cycloalkyl. For example, a suspension of the free 11β,16α,17α,21-tetrol in a ketone or aldehyde is treated with a trace of perchloric acid and stirred at room temperature until solution is complete. The ketones and aldehydes which are suitable for this purpose include acetaldehyde, methyl ethyl ketone, cyclohexanone, and acetophenone.

In a preferred embodiment of our invention acetone is used. For purposes of greater simplicity in the formulas the ketal shown in all the flow sheets is the 16α,17α-isopropylidenedioxy-derivative which is obtained with acetone. However, it is understood that other acetal and ketal derivatives may be substituted in these examples. The 16α,17α-acetonide group may be removed by heating for a short time with 60% formic acid.

The products of our invention include, among others, the following:

11β,16α,17α,21-tetrahydroxy-20-oxo-5α-pregnano-[3,2-c]pyrazole;

6α-chloro-11β,16α,17α,21-tetrahydroxy-20-oxo-5α-pregnano-[3,2-c]pyrazole;

6α-fluoro-11β,16α,17α21-tetrahydroxy-20-oxo-5α-pregnano-[3,2-c]pyrazole;

11β,16α,17α,21-tetrahydroxy-6α-methyl-20-oxo-5α-pregnano-[3,2-c]pyrazole;

9α-fluoro-11β,16α,17α,21-tetrahydroxy-20-oxo-5α-pregnano-[3,2-c]pyrazole;

6α-chloro-9α-fluoro-11β,16α,17α,21-tetrahydroxy-20-oxo-5α-pregnano-[3,2-c]pyrazole;

6α,9α-difluoro-11β,16α,17α,21-tetrahydroxy-20-oxo-5α-pregnano-[3,2-c]pyrazole;

9α-fluoro-11β,16α,17α,21-tetrahydroxy-6α-methyl-20-oxo-5α-pregnano-[3,2-c]pyrazole, and the 11-desoxy analogs.

This invention also includes the 16α,17α- acetals and ketals of the foregoing compounds, as well as the 1' and 2'-aryl-, 1'- and 2'-alkyl-, the 1'- and 2'-cycloalkyl-, the 1'- and 2'-aralkyl and the 1'- and 2'-substituted derivatives thereof which may be derived from any aromatic or heterocyclic nucleus of all the above named compounds. The 9α,11β-analogs are described in Flow Sheet C and in Example 3.

Flow Sheet B shows the preparation of our novel chemical compounds starting from Δ⁴-steroids in which the side chain has been protected by forming the 16α,17α-acetal or ketal, together with a tetrahydropyranyl group at carbon-21. The 16α,17α-acetonide (compound 15) is prepared from the 16α,17α-dihydroxysteroid, if desired, by heating with acetone in the presence of an acid catalyst such as HCl.

Detailed procedures for carrying out the reactions of Flow Sheet B are included in Example 2.

The 21-acyl derivatives (Flow Sheet D) are prepared from the N-substituted-16α,17α-isopropylidenedioxy-20-oxo-5α-pregnano-[3,2-c]pyrazoles (compounds 13A and 13B of Flow Sheet A and compounds 21A and 21B of Flow Sheet B) by treating with one equivalent of an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as β,β-dimethyl-glutaric anhydride, succinic anhydride and the like, in the presence of an organic base such as pyridine.

The 21-acyl derivatives of the N-unsubstituted-11β,21-dihydroxy - 16α,17α-isopropylidenedioxy-20-oxo-5α-pregnano - [3,2-c]pyrazoles are prepared by reacting the latter compounds with 2 equivalents of the acylating agent to form the N-acyl-21-acylate and then heating the latter compound with aqueous acetic acid, whereupon the N-acyl group is selectively removed.

The N-acyl-derivatives of the 21-hydroxy compounds are prepared by treating the N-unsubstituted-21-tetrahydropyranyl ether derivatives (compounds 13A and 13B of Flow Sheet A and (compounds 21A and 21B of Flow Sheet B) with an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as β,β-dimethyl-glutaric anhydride, succinic anhydride and the like, in the presence of an organic base such as pyridine. The 21-tetrahydropyranyl ether group is then removed by treating a methanol solution of the steroid with p-toluene-sulfonic acid.

In order to convert the 21-hydroxy group of an N-substituted - 11β,21-dihydroxy-16α,17α-isopropylidenedioxy-20-oxo-5α-pregnano-[3,2-c]pyrazole (compounds 13, 21 and 40 of Flow Sheet E) into the corresponding 21-desoxy-derivative (compound 44), the N-substituted -21-hydroxy-compound is first reacted with methane sulfonyl chloride in a non-aqueous base to form the 21-mesylate (compound 41). The 21-mesylate is heated with an alkali iodide to form the 21-iodo-steroid (compound 43), which is then reacted with an alkali metal bisulfite to form the 21-desoxy-derivative (compound 44).

In order to convert the 21-hydroxy group of an N-unsubstituted - 11β,21-dihydroxy-16α,17α-isopropylidenedioxy-20-oxo-5α-pregnano-[3,2-c]pyrazole (compounds 13 and 21 of Flow Sheet E) into the 21-desoxy derivative, the N-unsubstituted steroid is first converted into the N-carbamyl derivative by treating with a methanolic solution of potassium cyanate to which HCl has been added. The N-carbamyl derivative is then transformed into the various derivatives indicated on Flow Sheet E. The N-carbamyl group is finally removed by treatment with nitrous acid.

The 21-desoxy-compounds of our invention include the following: 11β,16α,17α - trihydroxy-20-oxo-5α-pregnano-[3,2-c]pyrazole; 6α-chloro - 11β,16α,17α - trihydroxy-20-oxo - 5α-pregnano-[3,2-c]pyrazole; 6α-fluoro-11β,16α,17α-trihydroxy - 20-oxo-5α-pregnano-[3,2-c]pyrazole; 11β,16α,17α - trihydroxy - 6α-methyl-20-oxo-5α-pregnano-[3,2-c] pyrazole; 6α - chloro - 9α-fluoro-11β,16α,17α-trihydroxy-20 - oxo-5α-pregnano-[3,2-c]pyrazole; 6α,9α-difluoro-11β,16α,17α - trihydroxy-20-oxo-5α-pregnano-[3,2-c]pyrazole; and 9α - fluoro-11β,16α,17α-trihydroxy-6α-methyl-20-oxo-5α-pregnano-[3,2-c]pyrazole, and the 11-desoxy analogs thereof.

This invention also includes the 16α,17α-acetals and ketals of the foregoing compounds, as well as the 1'- and 2'-acyl-, the 1'- and 2'-alkyl, the 1'- and 2'-cycloalkyl-, the 1'- and 2'-aralkyl-derivatives and the 1' and 2'-substituted derivatives which may be derived from any aromatic or heterocyclic nucleous of all of the above named compounds, as well as their 16α,17α-acetals and ketals.

The 21-fluoro-derivatives of all of the above named compounds are obtained by heating the corresponding 21-mesylate with an alkali metal fluoride, preferably in a solvent such as dimethylformamide.

The 21-chloro-derivatives of all of the above named compounds are obtained by heating the 21-mesylate with lithium chloride in a solvent such as dimethylformamide.

The 21-dihydrogen phosphate esters are prepared by the reaction of the corresponding 21-iodo compound with a mixture of silver phosphate and phosphoric acid. Both the mono and dialkali metal salts may be obtained by neutralization of the dihydrogen phosphate ester with an alkali metal hydroxide. Treatment with additional amounts of alkali methoxide will convert an N-acyl (R=acyl) into the free amine (R=H) dialkali metal salt from which the dihydrogen phosphate can be obtained by contacting with an ion exchange resin.

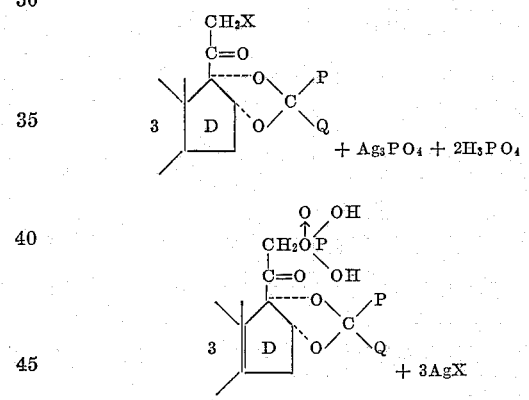

The [3,2-c]pyrazole compounds described in the foregoing structures form salts such as the hydrochloride, sulfate, chlorate, perchlorate, picrate and trichloroacetate, on treatment with the corresponding acid.

A further embodiment of our invention comprises novel pharmaceutical compositions containing the novel [3,2-c] pyrazole compounds of the pregnane series, exemplified in the foregoing structures.

The following examples illustrate methods of carrying out the present invention but it is to be understood that these examples are given for purposes of illustration and not of limitation.

FLOW SHEET A

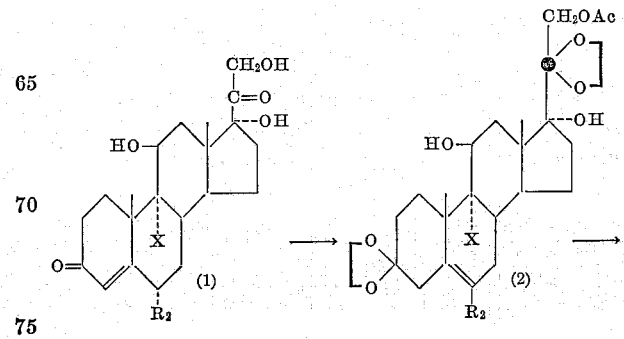

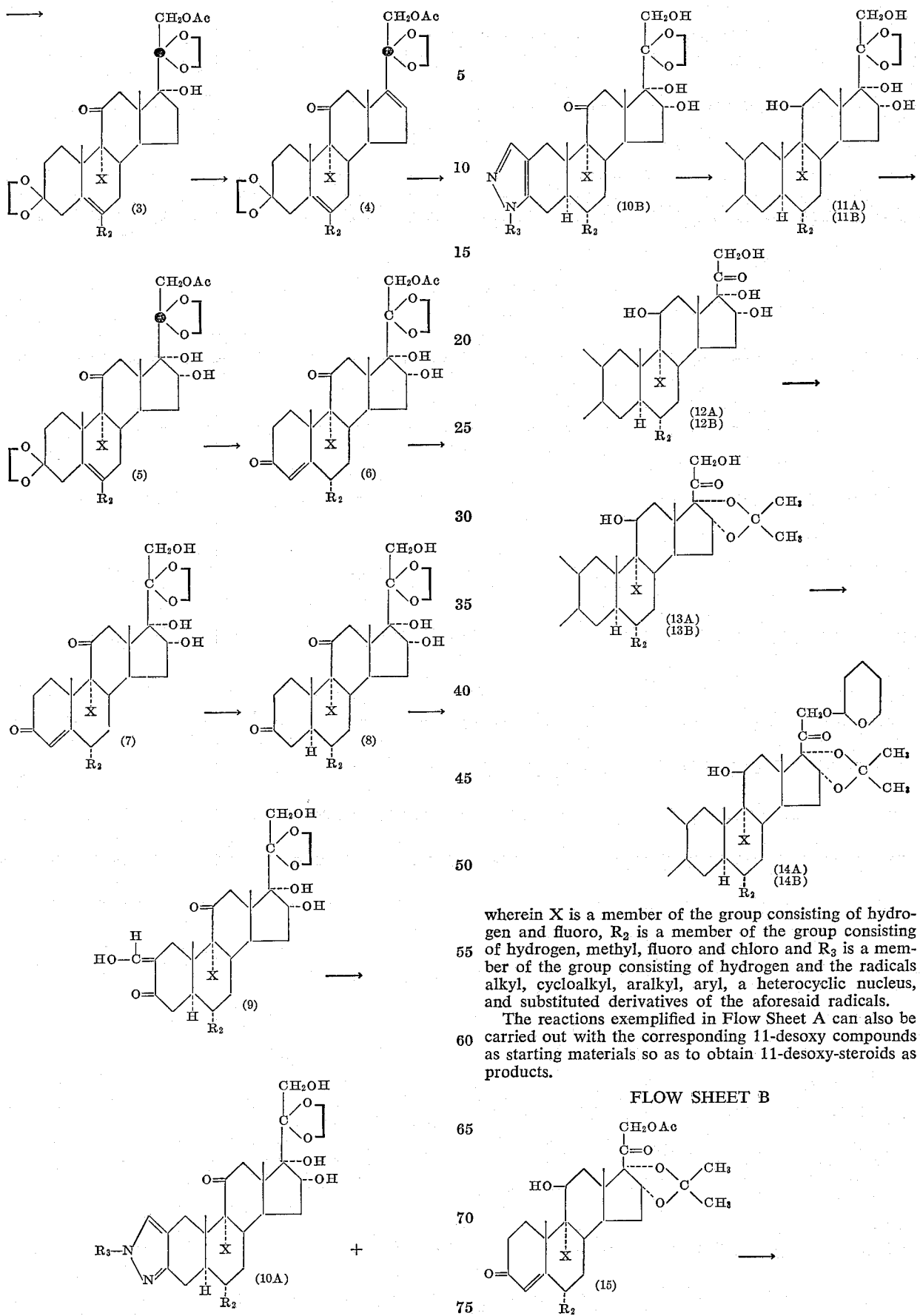

wherein X is a member of the group consisting of hydrogen and fluoro, $R_2$ is a member of the group consisting of hydrogen, methyl, fluoro and chloro and $R_3$ is a member of the group consisting of hydrogen and the radicals alkyl, cycloalkyl, aralkyl, aryl, a heterocyclic nucleus, and substituted derivatives of the aforesaid radicals.

The reactions exemplified in Flow Sheet A can also be carried out with the corresponding 11-desoxy compounds as starting materials so as to obtain 11-desoxy-steroids as products.

FLOW SHEET B

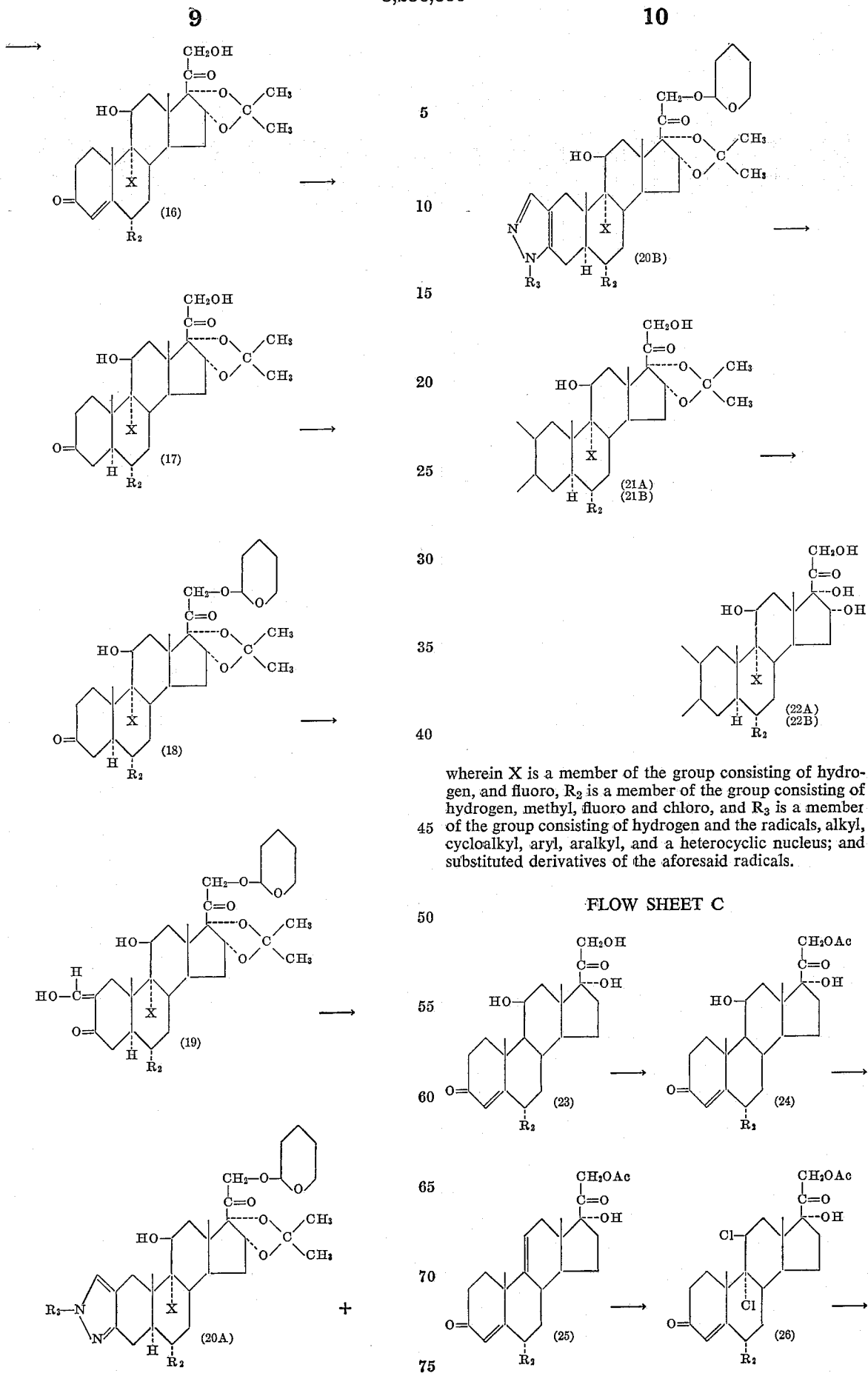
wherein X is a member of the group consisting of hydrogen, and fluoro, $R_2$ is a member of the group consisting of hydrogen, methyl, fluoro and chloro, and $R_3$ is a member of the group consisting of hydrogen and the radicals, alkyl, cycloalkyl, aryl, aralkyl, and a heterocyclic nucleus; and substituted derivatives of the aforesaid radicals.
FLOW SHEET C

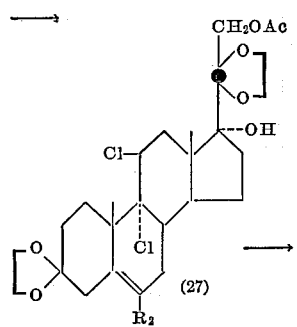 (27) 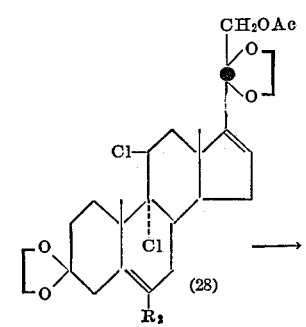 (28) 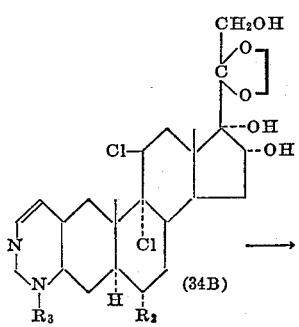 (34B) 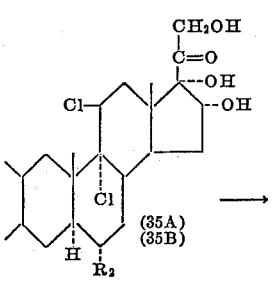 (35A) (35B)
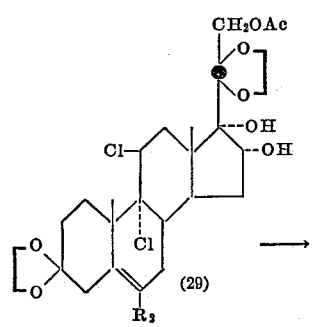 (29) 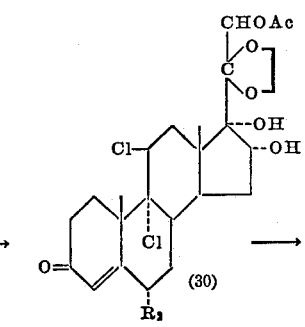 (30) 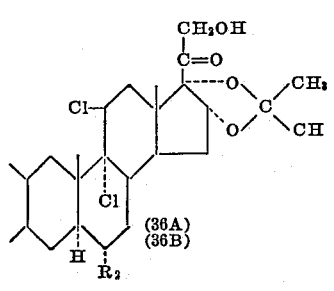 (36A) (36B)
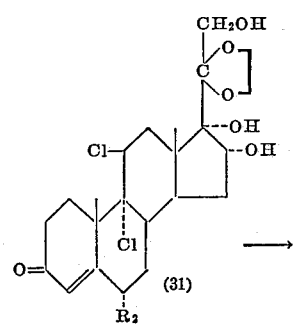 (31) 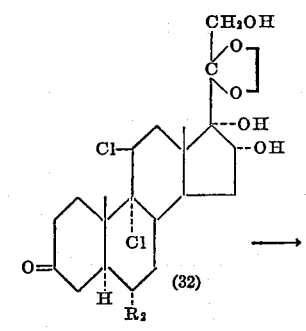 (32)
wherein $R_2$ is a member of the group consisting of hydrogen, methyl, chloro and fluoro and $R_3$ is a member of the group consisting of hydrogen and the radicals alkyl, cycloalkyl, aralkyl, aryl, a heterocyclic nucleus, and substituted derivatives of the aforesaid radicals.
FLOW SHEET D
(21-acyl and N-acyl-derivatives)
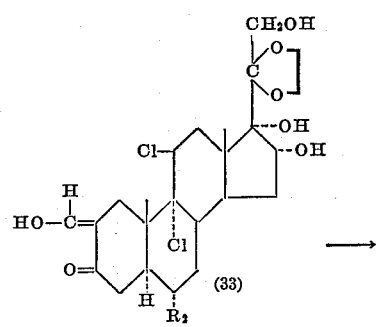 (33)
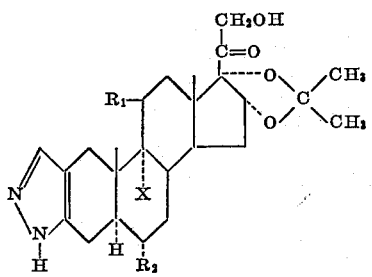
Flow Sheet A (13A), (13B) (R=H)
Flow Sheet B (21A), (21B) (R=H)
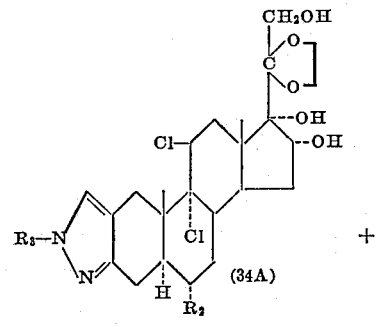 (34A) +
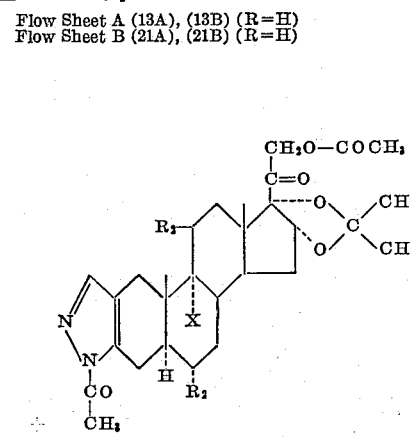 (37A) (37B)

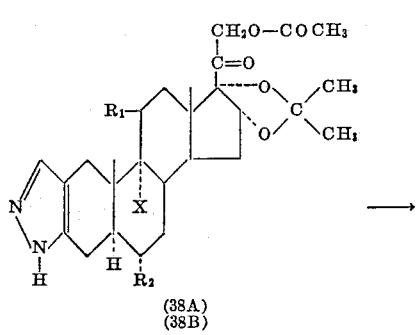
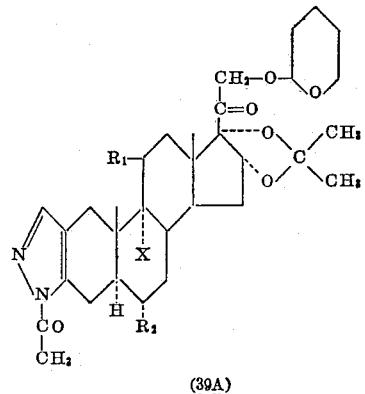
5
10
15
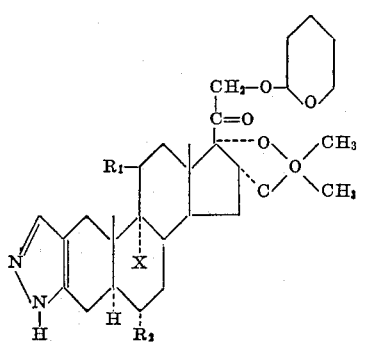
(38A)
(38B)
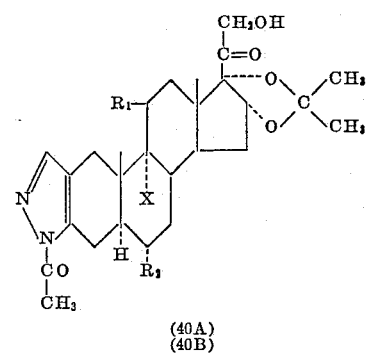
(39A)
(39B)
20
25
30
(40A)
(40B)
Flow Sheet A (14A), (14B) (R=H)
Flow Sheet B (20A), (20B) (R=H)
wherein X is a member of the group consisting of hydrogen, chloro and fluoro, $R_1$ is a member of the group consisting of β-hydroxy, β-chloro, hydrogen and keto, but halogen is present at $R_1$ only when X is halogen and $R_2$ is a member of the group consisting of hydrogen, methyl, chloro and fluoro.
FLOW SHEET E
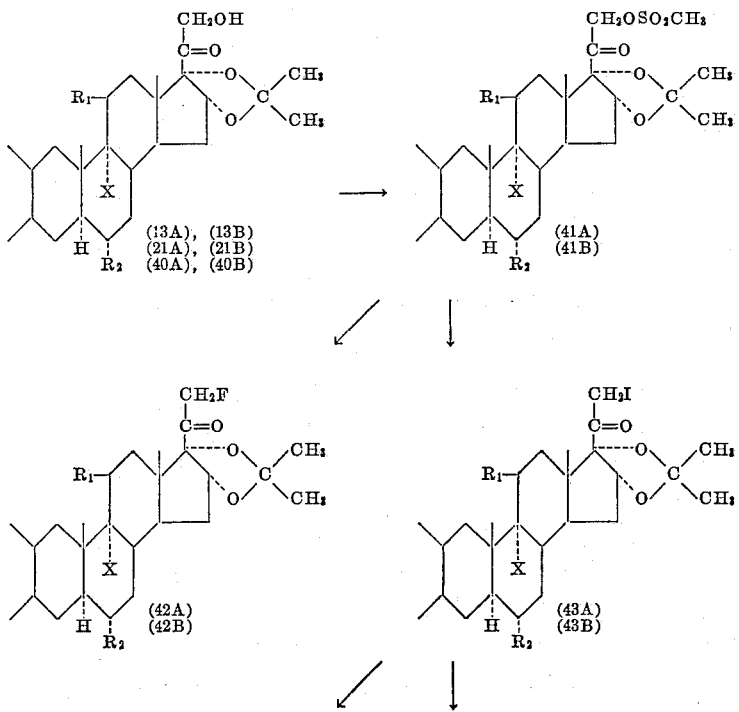

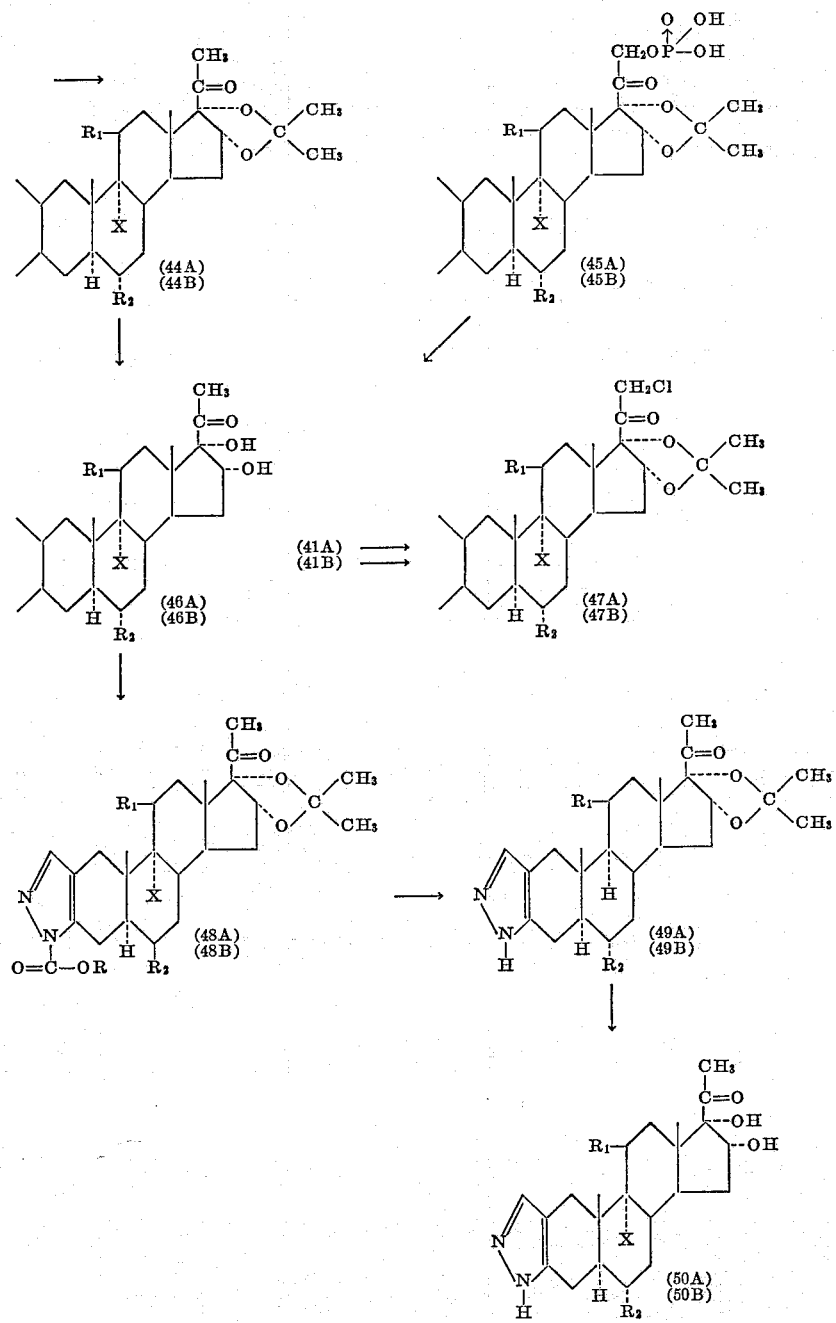

wherein $R_1$ is a member of the group consisting of β-hydroxy-, β-chloro-, hydrogen and keto, but halogen is present at $R_1$ only when X is halogen, $R_2$ is a member of the group consisting of methyl, fluoro, hydrogen and chloro, $R_3$ is a member of the group consisting of acyl, alkyl, cycloalkyl, aryl and a heterocyclic nucleus, and substituted derivatives thereof, and X is a member of the group consisting of hydrogen, chloro and fluoro.

*Example 1*

The following procedures which relate to Flow Sheet A are particularly described starting with the 6α,9α-difluoro-11β,17α,21-trihydroxy-4-pregnene-3,20-dione, but are generally applicable to all of the starting materials defined by Flow Sheet A.

A mixture of 500 mg. of 6α,9α-difluoro-11β,17α,21-trihydroxy-4-pregnene-3,20-dione, 4 ml. of ethylene glycol, 25 ml. of benzene and 25 mg. of p-toluenesulfonic acid monohydrate is refluxed in a Dean-Stark water separator for 8 hours. The reaction mixture is then cooled and some pyridine and ethyl acetate are added. After extraction with dilute sodium bicarbonate, the organic layers are dried and removed under vacuum. The entire crude material is dissolved in 2 ml. of pyridine and 2 ml. of acetic anhydride, and then left over night at room temperature. The reaction mixture is then taken to dryness on a rotating evaporator at the oil pump. The residue is dissolved in ethyl acetate and washed with dilute sodium bicarbonate. The ethyl acetate layer is then dried and the ethyl acetate is removed under vacuum. Chromatography on basic alumina affords 3ξ,20-bis(ethylenedioxy)-6α,9α-difluoro-11β,17α,21-trihydroxy-5-pregnene 21-acetate.

A solution of 400 mg. of 3ξ,20-bis(ethylenedioxy)-6α,9α - difluoro - 11β,17α,21 - trihydroxy - 5 - pregnene 21-acetate in 4 ml. of pyridine is added to the complex formed by the addition of 400 mg. of chromium trioxide to 4 ml. of pyridine. The mixture is thoroughly mixed and left at room temperature over night. The reaction mixture is poured into water. The aqueous mixture is extracted with ether and then twice with ethyl acetate. The combined solvent extracts are washed with dilute aqueous sulfuric acid at about 0° C. and then with dilute sodium bicarbonate. The organic solvent is dried and removed under vacuum. The residual material is purified by crystallization to give 3ξ,20-bis(ethylenedioxy)-6α,9α-difluoro - 17α,21 - dihydroxy - 5 - pregnene - 11 - one 21-acetate.

Thionyl chloride (0.45 ml.) is added dropwise to a magnetically stirred solution of 850 mg. of 3ξ,20-bis-(ethylenedioxy) - 6α,9α - difluoro - 17α,21 - dihydroxy-5-pregnene-11-one 21-acetate in 5 ml. of pyridine at −5° C. After 18 hours at this temperature the reaction mixture is poured into a stirred iced sodium bicarbonate solution. The product is extracted into chloroform and the chloroform layer is then dried and removed. Chromatography over basic alumina affords the 21-hydroxy-3ξ,20 - bis(ethylenedioxy) - 6α,9α - difluoro - 5,16-pregnadiene-11-one 21-acetate.

A solution of 266 mg. of osmium tetroxide in 5 ml. of benzene is added dropwise to a stirred solution of 465 mg. of 21 - hydroxy - 3ξ,20 - bis(ethylenedioxy) - 6α,9α-difluoro - 5,16 - pregnadiene - 11 - one 21 - acetate in 10 ml. of benzene and 0.3 ml. of pyridine. After one hour, there is added 12 ml. of methanol and then a solution of 1.3 g. of sodium sulfite and 1.3 g. of potassium bicarbonate in 18 ml. of water. This mixture is stirred vigorously for three hours and then filtered. The red-brown solid which is collected is extracted exhaustively with hot ethyl acetate. The combined organic layers are washed with water and taken to dryness. Crystallization from methanol affords 3ξ,20-bis(ethylenedioxy)-6α,9α-difluoro - 16α,17α,21 - trihydroxy - 5 - pregnene - 11 - one 21-acetate.

A solution of 150 mg. of 3ξ,20-bis(ethylenedioxy)-6α,9α, - difluoro - 16α,17α,21 - trihydroxy - 5 - pregnene-11-one 21-acetate in 3 ml. of glacial acetic acid is heated on the steam bath for twenty minutes. It is then poured into ice and water and extracted into chloroform. The organic layer is washed with aqueous sodium bicarbonate until all of the acid has been removed. Evaporation of the dried chloroform layer leaves a residue which is chromatographed over basic alumina to yield a fraction which after crystallization from methanol is 20-ethylenedioxy - 6α,9α - difluoro - 16α,17α,21 - trihydroxy - 4-pregnene-3,11-dione 21-acetate.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 20-ethylenedioxy-6α,9α - difluoro - 16α,17α,21 - trihydroxy - 4 - pregnene-3,11-dione.

20 - ethylenedioxy - 6α,9α - difluoro - 16α,17α,21 - trihydroxy-4-pregnene-3,11-dione (50 g.) is dissolved in 350 ml. of methanol and 2–5 liters of benzene on a steam bath. The steroid is hydrogenated using as catalyst 45.0 g. of 5% Pd/BaSO$_4$ at room temperature and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing over night at 5° C. there is obtained 20-ethylenedioxy - 6α,9α - difluoro - 16α,17α,21 - trihydroxy - 5α-pregnane-3,11-dione.

A suspension of 610 mg. of 20-ethylenedioxy-6α,9α-difluoro - 16α,17α,21 - trihydroxy - 5α - pregnane - 3,11-dione in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After two hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 20-ethylenedioxy-6α,9α-difluoro-16α,17α,21 - trihydroxy - 2 - hydroxymethylene - 5α-pregnane-3,11-dione, and/or formate esters thereof.

A 25 mg. aliquot of 20-ethylenedioxy-6α,9α-difluoro-16α,17α,21-trihydroxy-2-hydroxymethylene-5α-pregnane-3,11-dione, and/or the formate esters thereof, is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed under vacuum and the residue is extracted with hot methylene chloride. The methylene chloride solution is filtered to remove insolubles and taken to dryness. It is redissolved in 3 ml. of methanol and 0.5 ml. of sodium methoxide in methanol and left under nitrogen for 10 minutes. The alkoxide is neutralized with acetic acid and the mixture is diluted with ethyl acetate and washed with water. Removal of the dried solvent leaves 20-ethylenedioxy-6α,9α-difluoro - 16α,17α,21-trihydroxy-11-oxo-5α-pregnano-[3,2-c]pyrazole.

To a solution of 0.5 millimole of 20-ethylenedioxy-6α,9α-difluoro-16α,17α,21-trihydroxy - 2-hydroxymethylene-5α-pregnane-3,11-dione, and/or the formate esters thereof, in about 3 ml. of absolute ethanol is added 0.6 millimole of osdium acetate and then 0.6 millimole of methylhydrazine sulfate. The mixture is refluxed under nitrogen for 40 minutes and then filtered hot. The filtrate is taken to dryness, water is added, and the product is removed by filtration. It is redissolved in 30 ml. of methanol and 5 ml. of sodium methoxide in methanol and left under nitrogen for 10 minutes. The alkoxide is neutralized with acetic acid and the mixture is diluted with ethyl acetate and washed with water. Removal of the dried solvent leaves N-methyl-20-ethylenedioxy-6α,9α-difluoro-16α,17α,21-trihydroxy-11-oxo-5α - pregnano-[3,2-c]pyrazoles.

A mixture of the 1′-methyl- and 2′-methyl-20-ethylenedioxy-6α,9α-difluoro-16α,17α,21 - trihydroxy-11-oxo-5α-pregnano-[3,2-c]pyrazole is prepared by the following route: A mixture of 1 gram of 20-ethylenedioxy-6α,9α-difluoro-16α,17α,21-trihydroxy-2 - hydroxymethylene-5α-pregnane-3,11-dione, and/or the formate esters thereof, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum to give the desired 20-ethylenedioxy-6α,9α-difluoro-16α,17α,21-trihydroxy - 2 - methoxymethylene - 5α-pregnane-3,11-dione.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil or silica gel to yield the 1'-methyl- and the 2'-methyl-20-ethylenedioxy-6α,9α-difluoro - 16α,17α,21-trihydroxy-11-oxo-5α-pregnano-[3,2-c]pyrazole.

The 20-ethylenedioxy-6α,9α - difluoro-16α,17α,21-trihydroxy-N-methyl-11-oxo - 5α-pregnano-[3,2-c]pyrazoles may also be prepared by the following procedure: A solution of about 0.47 millimole of 20-ethylenedioxy-6α,9α-difluoro-16α,17α,21 - trihydroxy - 11-oxo-5α-pregnano-[3,2-c]pyrazole in 10 ml. of benzene is treated with 30–38 mg. of about 51% sodium hydride (in oil suspension). After the addition of 2–3 ml. of dimethylformamide (dried over calcium hydride) and 5 ml. of methyl iodide the mixture is stirred at room temperature over night. The product is filtered, washed with methylene chloride, and the filtrate and washings are taken to dryness. The residue is treated with water and the product is filtered to give N-methyl-20-ethylenedioxy-6α,9α-difluoro-16α,17α,21-trihydroxy-11 - oxo-5α-pregnano-[3,2-c]pyrazole.

In accordance with the above procedures, but using other alkylating agents in place of methyl iodide, there are obtained the corresponding N-alkyl-20-ethylenedioxy-6α,9α-difluoro-16α,17α,21 - trihydroxy - 11-oxo-5α-pregnano-[3,2-c]pyrazole.

In accordance with all of the above procedures but starting with the 2-hydroxymethylene derivatives of the compounds listed in columns 2 and 3 there are obtained the corresponding 1'-methyl- and 2'-methyl derivatives.

A mixture of 90 mg. of 20-ethylenedioxy-6α,9α-difluoro-16α,17α,21-trihydroxy - 2 - hydroxymethylene-5α-pregnane-3,11-dione, and its derived formates, and 0.028 ml. of phenylhydrazine is refluxed under nitrogen in 1.2 ml. of absolute ethanol for about 50 minutes. The reaction mixture is taken to dryness. Water is added and the product is filtered to give an amorphous solid. It is redissolved in 8 ml. of methanol and 2 ml. of 1 N sodium methoxide in methanol and left under nitrogen for 10 minutes. The alkoxide is neutralized with acetic acid and the mixture is diluted with ethyl acetate and washed with water. Removal of the dried solvent leaves 2'-phenyl-20-ethylenedioxy - 6α,9α - difluoro-16α,17α,21-trihydroxy-11-oxo-5α-pregnano-[3,2-c]pyrazole.

A mixture of the 1'-phenyl- and 2'-phenyl-20-ethylenedioxy-6α,9α-difluoro-16α,17α,21-trihydroxy-1-oxo-5α-pregnano-[3,2-c]pyrazole is prepared by the following route: A mixture of 1 gram of 20-ethylenedioxy-6α,9α-difluoro-16α,17α,21-trihydroxy-2-hydroxymethylene-5α - pregnane-3,11-dione, and its derived formates, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 20-ethylenedioxy-6α,9α-difluoro-16α,17α,21-trihydroxy-2 - methoxymethylene-5α-pregnane-3,11-dione is obtained by chromatography on acid-washed alumina and elution with ether:chloroform mixtures.

A mixture of 500 mg. of the above 2-methoxymethylene-5α-pregnane-3,11-dione is obtained by chromatography on acid-washed alumina and elution with ether:chloroform mixtures.

A mixture of 500 mg. of the above 2-methoxymethylene-steroid, 100 ml. of ethanol, and 1 ml. of phenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil (an activated magnesium silicate made according to U.S.P. 2,393,625) or silica gel to yield the 1'-phenyl- and 2'-phenyl-20-ethylenedioxy-6α,9α-difluoro - 16α,17α,21 - trihydroxy-11-oxo-5α-pregnano-[3,2-c]pyrazole.

In accordance with the above procedures, but starting with the 2-hydroxymethylene-derivative which is obtained from each of the starting materials which are listed in columns 2 and 3 there are obtained the corresponding 1'-phenyl- and 2-phenyl-derivatives.

In accordance with the above procedures, but using other substituted hydrazines such as cyclohexylhydrazine, p-tolylhydrazine, p - chlorophenylhydrazine, p - methoxyphenylhydrazine, or benzylhydrazine in place of phenylhydrazine, there are obtained the corresponding 1' and 2'-cyclohexyl-, 1'- and 2'-p-tolyl-, 1'- and 2'-(p-chlorophenyl)-, 1'- and 2'-(p-methoxyphenyl)-, and 1'- and 2'-benzyl-20-ethylenedioxy-6α,9α-difluoro-16α,17α,21 - trihydroxy-11-oxo-5α-pregnano-[3,2-c]pyrazoles.

A 111.5 mg. sample of 20-ethylenedioxy-6α,9α-difluoro-16α,17α,21-trihydroxy-2-hydroxymethylene - 5α - pregnane-3,11-dione, and/or the formate esters thereof, is suspended in 2.5 ml. of ethanol and treated with 24.5 mg. of sodium acetate, followed by the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum. It is redissolved in 12 ml. of methanol and 2.0 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-(p-fluorophenyl)-20-ethylenedioxy-6α,9α-difluoro - 16α,17α,21 - trihydroxy-11-oxo-5α-pregnano-[3,2-c]pyrazole A mixture of 1'-(p-fluorophenyl)- and 2' - (p-fluorophenyl)-20-ethylenedioxy-6α,9α-difluoro - 16α,17α,21 - trihydroxy-11-oxo-5α-pregnano-[3,2-c]pyrazole is prepared by the following route: A mixture of 1 gram of 20-ethylenedioxy-6α,9α-difluoro-16α,17α,21-trihydroxy-2-hydroxymethylene-5α-pregnane - 3,11 - dione, and/or the formate esters thereof, 200 ml. of methanol and 200 mg. of p-toluenesulfonic acid is left at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 20-ethylenedioxy-6α,9α - difluoro - 16α,17α,21 - trihydroxy-2-methoxymethylene-5α-pregnane-3,11-dione is obtained by chromatography on acid washed alumina and elution with ether:chloroform mixtures.

A mixture of 500 mg. of the 2-methoxymethylene-derivative, 100 ml. of ethanol, and 1 ml. of p-fluorophenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl)- and 2'-(p-fluorophenyl)-20-ethylenedioxy - 6α,9α - difluoro - 16α, 17α,21-trihydroxy-11-oxo-5α-pregnano-[3,2-c]pyrazole.

In accordance with the above procedures, but starting with the 2-hydroxymethylene derivative which is obtained from each of the starting materials which are listed in columns 2 and 3 there are obtained the corresponding 1'-(p-fluorophenyl)- and 2'-(p-fluorophenyl)-derivatives.

Sodium borohydride (200 mg.) is added to a solution of 250 mg. of 20-ethylenedioxy-6α,9α-difluoro-16α,17α,21-trihydroxy-11-oxo-5α-pregnano-[3,2-c]pyrazole, in 10 cc. of dimethyl formamide. After 18 hours, most of the solvent is removed under vacuum on a rotating evaporator, water is added and the product is collected by filtration. It is recrystallized from methanol to afford 20-ethylenedioxy - 6α,9α - difluoro - 11β,16α,17α,21-tetrahydroxy-5α-pregnano-[3,2-c]pyrazole.

A mixture of 2.9 grams of 20-ethylenedioxy-6α,9α-difluoro-11β,16α,17α,21-tetrahydroxy-5α-pregnano-[3,2-c]pyrazole, 100 ml. of methanol, and 6 ml. of a solution prepared by diluting 8 ml. of sulfuric acid with 100 ml. of water is refluxed for one hour and then concentrated under vacuum. The product is extracted with ethyl acetate and the extract is washed with aqueous sodium bicarbonate, salt, and then water. The mixture is dried over magnesium sulfate and then taken to dryness to give 6α,9α - difluoro-11β,16α,17α,21-tetrahydroxy-20-oxo-5α-pregnano-[3,2-c]pyrazole.

The 6α,9α - difluoro - 11β,16α,17α,21-tetrahydroxy-20-oxo-5α-pregnano-[3,2-c]pyrazole (100 mg.) is heated for 3 minutes with 10 ml. of acetone to which 1 drop of concentrated hydrochloric acid has been added and then letting stand at room temperature for 24 hours. The mixture is then poured into a dilute sodium bicarbonate solution and extracted with ethyl acetate. The extracts are washed, dried over magnesium sulfate and taken to dryness to give the 6α,9α-difluoro-11β,21-dihydroxy-16α,17α - isopropylidenedioxy-20-oxo-5α-pregnano-[3,2-c]pyrazole.

In accordance with the above procedure, but using an equivalent quantity of another aldehyde or ketone such as those described in column 4, there is obtained the corresponding 16α,17α-acetal or ketal.

In accordance with the last two procedures, but starting with the 11-keto derivative rather than with 20-ethylenedioxy - 6α,9α-difluoro-11β,16α,17α,21-tetrahydroxy-5α-pregnano-[3,2-c]pyrazole, the corresponding 11-keto-derivative is obtained.

*Example 2*

The following procedures which relate to Flow Sheet B are particularly described starting with the 6α,9α-difluoro - 11β,21-dihydroxy-16α,17α-isopropylidenedioxy-4-pregnene-3,20-dione, but are generally applicable to all the starting materials defined in Flow Sheet B Compound 15.

A 500 mg. aliquot of 11β,21-dihydroxy-6α,9α-difluoro-16α,17α - isopropylidenedioxy-4-pregnene-3,20-dione 21-acetate is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 6α,9α-difluoro-11β,21-dihydroxy-16α,17α-isopropylidenedioxy-4-pregnene-3,20-dione.

6α,9α - difluoro - 11β,21-dihydroxy-16α,17α-isopropylidenedioxy-4-pregnene-3,20-dione (50 g.) is dissolved in 350 ml. of methanol and 2–5 liters of benzene on a steam bath. The steroid is reduced at room temperature using as catalyst 45.0 g. of 5% Pd/BaSO4 and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing over night at 5° C. there is obtained 6α,9α-difluoro-11β,21 - dihydroxy-16α,17α-isopropylidenedioxy-5α-pregnane-3,20-dione. This is converted into the 21-tetrahydropyranyloxysteroid by the procedures described in columns 29 and 30.

The 6α,9α - difluoro-21-tetrahydropyranyloxy-11β-hydroxy - 16α,17α - isopropylidenedioxy - 5α-pregnane-3,20-dione (350 mg.) is dissolved in 25 ml. of dry, hot benzene and the resulting solution is cooled to room temperature and treated with 1.0 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 6α,9α - difluoro-21-tetrahydropyranyloxy-11β-hydroxy-2-hydroxymethylene - 16α,17α-isopropylidenedioxy-5α-pregnane-3,20-dione, and/or the formate esters thereof.

The 6α,9α-difluoro - 21 - tetrahydropyranyloxy-11β-hydroxy-2-hydroxymethylene - 16α,17α - isopropyl - idenedioxy-5α-pregnane-3,20-dione, and/or the formate esters thereof (565 mg.) is dissolved in 9.0 ml. of absolute ethanol and treated with a solution of hydrazine hydrate (60 mg., 1.2 equivalents) dissolved in 1.0 ml. of absolute ethanol. The mixture is refluxed in a nitrogen atmosphere for about 3 hours and then evaporated to dryness under reduced pressure. The residue is washed three times with cold water and the resulting amorphous solid is dried at 80° C. for 1 hour in high vacuum. It is redissolved in 30 ml. of methanol and 5 ml. of sodium methoxide in methanol and left under nitrogen for 10 minutes. The alkoxide is neutralized with acetic acid and the mixture is diluted with ethyl acetate and washed with water. Removal of the dried solvent leaves 6α,9α-difluoro-21-tetrahydropyranyloxy-11β-hydroxy - 16α,17α - isopropylidenedioxy-20-oxo-5α-pregnano-[3,2-c]pyrazole.

To a solution of 0.5 millimoles of 6α,9α-difluoro-21-tetrahydropyranyloxy - 11β - hydroxy - 2 - hydroxymethylene - 16α,17α - isopropylidenedioxy - 5α - pregnane - 3,20 - dione, and/or the formate esters thereof, in about 3 ml. of absolute ethanol is added 0.6 millimoles of sodium acetate and then 0.6 millimoles of methylhydrazine sulfate. The mixture is refluxed under nitrogen for 40 minutes and then filtered hot. The filtrate is taken to dryness. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves N-methyl-6α,9α-difluoro-21-tetrahydropyranyloxy - 11β - hydroxy-16α, 17α-isopropylidenedioxy - 20 - oxo - 5α - pregnano-[3,2-c]pyrazole.

A mixture of 1'-methyl- and 2'-methyl-6α,9α-difluoro-21 - tetrahydropyranyloxy - 11β - hydroxy-16α,17α-isopropylidenedioxy-20-oxo-5α-pregnano-[3,2-c]pyrazole is prepared by the following route: One gram of 6α,9α-difluoro-21-tetrahydropyranyloxy - 11β - hydroxy-2-hydroxymethylene - 16α,17α - isopropylidenedioxy - 5α - pregnane-3,20-dione, and/or the formate esters thereof, in 50 ml. of dry dioxane is treated with excess ethereal diazomethane for one hour. The reaction mixture is taken to near dryness under vacuum, ethyl acetate is added and the organic layer is washed two times with 2 N aqueous sodium hydroxide solution and then with water. The ethyl acetate extract is then dried and concentrated under vacuum. The 6α,9α-difluoro - 21 - tetrahydropyranyloxy - 11β - hydroxy-2-methoxymethylene - 16α,17α - isopropylidenedioxy-5α-pregnane-3,20-dione is obtained by chromatography on silica gel.

A mixture of 580 mg. of the above 2-methoxymethylene-derivative, 10 ml. of ethanol, and 56 mg. (1.2 equivalents) of methylhydrazine is heated under nitrogen for three hours and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel to yield the 1'-methyl- and the 2'-methyl-6α,9α-difluoro - 21 - tetrahydropyranyloxy-11β-hydroxy-16α,17α-isopropylidenedioxy-20-oxo-5α-pregnano-[3,2-c]pyrazole.

A mixture of the 1'-methyl and the 2'-methyl-6α,9α-difluoro-21-tetrahydropyranyloxy - 11β - hydroxy-16α,17α-isopropylidenedioxy - 20 - oxo-5α-pregnano-[3,2-c]pyrazoles may also be prepared by the following procedure: A solution of about 0.47 millimole of 6α,9α-difluoro-21-tetrahydropyranyloxy-11β-hydroxy - 16α,17α - isopropylidenedioxy-20-oxo-5α-pregnano-[3,2-c]pyrazole in 10 ml. of benzene is treated with 30–38 mg. of about 51% sodium hydride (in oil suspension) after the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue may be chromatographed on silica gel or florisil to yield the 1'- and 2'-methyl-6α,9α-difluoro - 21 - tetrahydropyranyloxy-11β-hydroxy-16α,17α-isopropylidenedioxy - 20 - oxo - 5α - pregnano-[3,2-c]pyrazoles.

In accordance with the above procedures, but using other alkylating agents in place of methyl iodide, there are obtained the corresponding N - alkyl - 6α,9α - difluoro-21-tetrahydropyranyloxy - 11β - hydroxy-16α,17α-isopropylidenedioxy-20-oxo-5α-pregnano-[3,2-c]pyrazoles.

A mixture of 565 mg. of 6α,9α-difluoro-21-tetrahydropyranyloxy - 11β-hydroxy-2-hydroxy-methylene-16α,17α-isopropylidenedioxy-5α-pregnane-3,20-dione and/or the formate esters thereof, and 130 mg. (1.2 equivalents) of phenylhydrazine are refluxed under nitrogen in 8 ml. of absolute ethanol for about three hours. The reaction mixture is taken to dryness. Water is added and the product is filtered to give an amorphous solid, which is washed successively with water, dilute acid, water, and petroleum ether. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-phenyl-6α,9α-difluoro-21-tetrahydropyranyloxy - 11β - hydroxy-16α,17α-propylidenedioxy-20-oxo-5α-pregnano-[3,2-c]pyrazole.

A mixture of the 1'-phenyl- and 2'-phenyl-6α,9α-difluoro - 21 - tetrahydropyranyloxy-11β-hydroxy-16α,17α-propylidenedioxy-20-oxo-5α-pregnano-[3,2-c]pyrazole is prepared by the following route: One gram of 6α,9α-difluoro - 21 - tetrahydropyranyloxy - 11β-hydroxy-2-hydroxy-methylene - 16α,17α-isopropylidenedioxy-5α-pregnane-3,20-dione, and/or the formate esters thereof, in 50 ml. of dry dioxane is treated with excess ethereal diazomethane for one hour. The reaction mixture is taken to near dryness under vacuum, ethyl acetate is added and the organic layer is washed two times with 2 N aqueous sodium hydroxide solution and then with water. The ethyl acetate extract is then dried and concentrated under vacuum.

The 6α,9α - difluoro-21-tetrahydropyranyloxy-11β-hydroxy - 2 - methoxymethylene-16α,17α-isopropylidenedioxy-5α-pregnane-3,20-dione is obtained by chromatography on silica gel.

A mixture of 580 mg. of the above 2-methoxymethylene-steroid, 10 ml. of ethanol and 130 mg. (1.2 equivalents) of phenylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel or Florisil to yield the 1'-phenyl- and 2'-phenyl - 6α,9α-difluoro-21-tetrahydropyranyloxy-11β-hydroxy - 16α,17α - propylidenedioxy-20-oxo-5α-pregnano-[3,2-c]pyrazole.

A 565 mg. sample of 6α,9α-difluoro-21-tetrahydropyranyloxy - 11β - hydroxy - 2-hydroxy-methylene-16α,17α-isopropylidenedioxy-5α-pregnane-3,20-dione and/or the formate esters thereof is suspended in 10 ml. of ethanol and treated with 100 mg. (1.2 equivalents) of sodium acetate, followed with the addition of 195 mg. (1.2 equivalents) of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-(p-fluorophenyl) - 6α,9α - difluoro-21-tetrahydropyranyloxy-11β - hydroxy - 16α,17α-isopropylidenedioxy-20-oxo-5α-pregnano-[3,2-c]pyrazole.

A mixture of 1'-(p-fluorophenyl)- and 2'-(p-fluorophenyl) - 6α,9α - difluoro-21-tetrahydropyranyloxy-11β-hydroxy - 16α,17α - isopropylidenedioxy-20-oxo-5α-pregnano-[3,2-c]pyrazole is prepared by the following route: One gram of 6α,9α-difluoro-21-tetrahydropyranyloxy-11β-hydroxy - 2 - hydroxy-methylene-16α,17α-isopropylidenedioxy-5α-pregnane-3,20-dione, and/or the formate esters thereof, in 50 ml. of dry dioxane is treated with excess ethereal diazomethane for one hour. The reaction mixture is taken to near dryness under vacuum, ethyl acetate is added and the organic layer is washed two times with 2 N aqueous sodium hydroxide solution and then with water. The ethyl acetate extract is then dried and concentrated under vacuum. The 6α,9α-difluoro-21-tetrahydropyranyloxy - 11β - hydroxy-2-methoxymethylene-16α,17α-isopropylidenedioxy-5α-pregnane-3,20-dione is obtained by chromatography on neutral alumina.

A mixture of 500 mg. of the 2-methoxymethylene-derivatives, 100 ml. of ethanol, and 1 ml. of p-fluorophenylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on neutral alumina to afford the 1'-(p-fluorophenyl)- and 2' - (p - fluorophenyl)-6α,9α-difluoro-21-tetrahydropyranyloxy - 11β - hydroxy-16α,17α-isopropylidenedioxy-20-oxo-5α-pregnano-[3,2-c]pyrazole.

In accordance with the above procedure, but using each of the monosubstituted hydrazines listed in column 3, there is obtained the corresponding 1'- and 2'-substituted derivatives of the above 6α,9α-difluoro-21-tetrahydropyranyloxy-11β-hydroxy-16α,17α-isopropylidenedioxy - 20-oxo-5α-pregnano-[3,2-c]pyrazole.

The 6α,9α-difluoro-21-tetrahydropyranyloxy-11β - hydroxy-16α,17α-isopropylidenedioxy-20-oxo-5α - pregnano-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed in vacuo and the residue treated with 3 ml. of ethyl acetate. The insoluble material is filtered off and the organic layer is washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried under vacuum to give 23.0 mg. of 6α,9α-difluoro-11β,21-dihydroxy-16α,17α-isopropylidenedioxy-20-oxo-5α - pregnano-[3,2-c]pyrazole.

In accordance with the above procedure, but starting with an N-alkyl-, N-cycloalkyl-, N-aryl-, N-acyl-, or N-aralkyl-6α,9α-difluoro-21-tetrahydropyranyloxy-11β - hydroxy-16α,17α-isopropylidenedioxy-20-oxo-5α - pregnano-[3,2-c]pyrazole, there is obtained the corresponding substituted-6α,9α-difluoro-11β,21-dihydroxy-16α,17α - isopropylidenedioxy-20-oxo-5α-pregnano-[3,2-c]pyrazole.

Example 3

The following procedures which relate to Flow Sheet C are particularly described starting with the 11β,17α,21-trihydroxy-4-pregnene-3,20-dione, but are generally applicable to all the starting materials defined in Flow Sheet C Compound 23.

To a solution of 100 mg. of 17α,21-dihydroxy-4-pregnene-3,20-dione in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The product is then crystallized from a solvent, alternately, the product may be chomatographed on alumina and the 17α,21-dihydroxy-4-pregnene-3,20-dione 21-acetate is isolated by crystallization of the appropriate eluate.

A solution of 400 mg. of 17α,21-dihydroxy-4-pregnene-3,20-dione 21-acetate in 2.0 ml. of dimethyl formamide, 0.8 ml. of pyridine and 0.4 ml. of methanesulfonyl chloride is allowed to stand at 75° C. for one hour. The mixture is cooled and water is added. The precipitate formed is filtered, washed with water, dried in air and purified by chromatography on alumina and elution with benzene. Crystallization gives 17α,21-dihydroxy-4,9(11)-pregnadiene-3,20-dione 21-acetate.

To a stirred, cooled (0–5° C.) solution of 17α,21-dihydroxy-4,9(11)-pregnadiene-3,20-dione-21 - acetate (1.0 g.) and lithium chloride (4.0 g.) in glacial acetic acid (40 ml.) is added N-chlorosuccinimide (383 mg., 1.1 equivalent) followed immediately by an anhydrous solution of hydrogen chloride (104 mg.) in tetrahydrofuran (1.0 ml.). Stirring is continued at room temperature for 3 hours, and the reaction mixture is poured into water (400 ml.). The resulting mixture is filtered and the residue is washed with water, and dried to yield a crude product. Crystallization from acetone gives 9α,11β-dichloro-17α,21-dihydroxy-4-pregnene-3,20-dione 21-acetate.

A mixture of 500 mg. of 9α,11β-dichloro-17α,21-dihydroxy-4-pregnene-3,20-dione 21-acetate, 4 ml. of ethylene glycol, 25 ml. of benzene and 25 mg. of p-toluenesulfonic acid monohydrate is refluxed in a Dean-Stark water separator for 8 hours. The reaction mixture is then cooled and some pyridine and ethyl acetate are added. After extraction with dilute sodium bicarbonate, the organic layers are dried and removed under vacuum. The entire crude material is dissolved in 2 ml. of pyridine and 2 ml. of acetic anhydride, and then left overnight at room temperature. The reaction mixture is then taken to dryness on a rotating evaporator at the oil pump. The residue is dissolved in ethyl acetate and washed with dilute sodium bicarbonate. The ethyl acetate layer is then dried and the ethyl acetate is removed under vacuum. Chromatography on basic alumina affords 3ξ,20-bis(ethylenedioxy)-9α,11β-dichloro-17α,21-dihydroxy-5 - pregnene 21-acetate.

Thionyl chloride (0.45 ml.) is added dropwise to a magnetically stirred solution of 850 mg. of 3ξ,20-bis(ethylenedioxy) - 9α,11β - dichloro-17α,21-dihydroxy-5-pregnene 21-acetate in 5 ml. of pyridine at −5° C. After 18 hours at this temperature the reaction mixture is poured into a stirred iced sodium bicarbonate solution. The product is extracted into chloroform and the chloroform layer is then dried and removed. Chromatography over basic alumina affords the 21-hydroxy-3ξ,20-bis(ethylenedioxy) - 9α,11β - dichloro - 5,16 - pregnadiene 21-acetate. A solution of 266 mg. of osmium tetroxide in 5 ml. of benzene is added dropwise to a stirred solution of 465 mg. of 21-hydroxy-3ξ,20-bis(ethylenedioxy)-9α,11β-dichloro-5,16-pregnadiene 21-acetate in 10 ml. of benzene and 0.3 ml. of pyridine. After one hour, there is added 12 ml. of methanol and then a solution of 1.3 g. of sodium sulfite and 1.3 g. of potassium bicarbonate in 18 ml. of water. This mixture is stirred vigorously for three hours and then filtered. The red-brown solid which is collected is extracted exhaustively with hot ethyl acetate. The combined organic layers are washed with water and taken to dryness. Crystallization from methanol affords 3ξ,20-bis(ethylenedioxy)-9α,11β - dichloro - 16α,17α,21 - trihydroxy-5-pregnene 21-acetate.

A solution of 150 mg. of 3ξ,20-bis-(ethylenedioxy)-9α,-11β - dichloro - 16α,17α,21-trihydroxy-5-pregnene 21-acetate in 3 ml. of glacial acetic acid is heated on the steam bath for twenty minutes. It is then poured into ice and water and extracted into chloroform. The organic layer is washed with aqueous sodium bicarbonate until all of the acid has been removed. Evaporation of the dried chloroform layer leaves a residue which is chromatographed over basic alumina to yield a fraction which after crystallization from methanol is 20-ethylenedioxy-9α,11β - dichloro-16α,17α,21-trihydroxy-4-pregnene-3-one 21-acetate.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give the 20-ethylenedioxy-9α,11β - dichloro - 16α,17α,21 - trihydroxy - 4-pregnene-3-one.

20 - ethylenedioxy - 9α,11β - dichloro-16α,17α,21-trihydroxy-4-pregnene-3-one (50 g.) is dissolved in 350 ml. of methanol and 2–5 liters of benzene on a steam bath. The steroid is hydrogenated at room temperature using as catalyst 45.0 g. of 5% Pd/BaSO$_4$ and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing overnight at 5° C. there is obtained 20-ethylenedioxy-9α,11β-dichloro - 16α,17α,21 - trihydroxy - 5α - pregnane-3-one.

The 20-ethylenedioxy-9α,11β-dichloro - 16α,17α,21-trihydroxy-5α-pregnane-3-one (500 mg.) is suspended in 8.5 cc. of dry benzene and treated with 0.15 ml. of freshly distilled ethyl formate. The air in the system is replaced with nitrogen and 225 mg. of sodium hydride (as a 58% dispersion in mineral oil is added). The system is again evacuated and filled with nitrogen. The mixture is stirred under nitrogen for ½ hour after which time 0.2 ml. of ethyl formate is added and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as a sodium salt by extraction into a 10% solution of sodium carbonate. The aqueous alkaline extracts are again acidified with an excess of a saturated aqueous solution of sodium dihydrogen phosphate and extracted into ether. The combined organic extracts are dried over sodium sulfate and evaporated to dryness to give 20 - ethylenedioxy - 9α,11β-dichloro - 16α,17α,21 - trihydroxy - 2 - hydroxymethylene-5α-pregnane-3-one.

The 20 - ethylenedioxy - 9α,11β - dichloro - 16α,17α,21-trihydroxy - 2 - hydroxymethylene - 5α - pregnane-3-one (65 mg.) is dissolved in 0.7 ml. of absolute ethanol and treated with a solution of 0.12 ml. of hydrazine hydrate dissolved in 0.12 ml. of absolute ethanol. The mixture is refluxed in a nitrogen atmosphere for about 45 minutes and then evaporated to dryness under reduced pressure. The residue is dissolved in chloroform and petroleum ether is added to give a solid which is 20-ethylenedioxy - 9α,11β - dichloro - 16α,17α,21-trihydroxy-5α-pregnano-[3,2-c]pyrazole.

The 20 - ethylenedioxy - 9α,11β-dichloro-16α,17α,21-trihydroxy-2-hydroxymethylene-5α - pregnane - 3 - one (19 mg.) and 0.028 ml. of phenylhydrazine is refluxed under nitrogen in 1.2 ml. of absolute ethanol for about 50 minutes. The reaction mixture is taken to dryness. Water is added and the product is filtered to give an amorphous solid. It is redissolved in 8 ml. of methanol and 2 ml. of 1 M sodium methoxide in methanol and left under nitrogen for 10 minutes. The alkoxide is neutralized with acetic acid and the mixture is diluted with ethyl acetate and washed with water. Removal of the dried solvent leaves 2'-phenyl-20-ethylenedioxy-9α,11β-dichloro-16α,17α,21-trihydroxy-5α-pregnano-[3,2-c]pyrazole.

A mixture of the 1'-phenyl- and 2'-phenyl-20-ethylenedioxy-9α,11β-dichloro-16α,17α,21 - trihydroxy - 5α - pregnano-[3,2-c]pyrazole is prepared by the following route: A mixture of 1 gram of 20-ethylenedioxy-9α,11β-dichloro-16α,17α,21-trihydroxy-2-hydroxymethylene-5α - pregnane-3-one, and its derived formates, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 20-ethylenedioxy-9α,11β-dichloro-16α,17α,21-trihydroxy-2-methoxymethylene-5α - pregnane-3-one is obtained by chromatography on acid-washed alumina and elution with ether:chloroform mixtures.

A mixture of 500 mg. of the above 2-methoxymethylene-steroid, 100 ml. of ethanol, and 1 ml. of phenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil (an activated magnesium silicate made according to U.S.P. 2393625) or silica gel to yield the 1'-phenyl- and 2'-phenyl-20-ethylenedioxy-9α, 11β - dichloro-16α,17α,21-trihydroxy-5α-pregnano-[3,2-c] pyrazole.

In accordance with the above procedures, but using other substituted hydrazines such as cyclohexylhydrazine, p-tolylhydrazine, p - chlorophenylhydrazine, p - methoxyphenylhydrazine, or benzylhydrazine in place of phenyldrazine, there are obtained the corresponding 1'- and 2'-cyclohexyl-, 1'- and 2'-p-tolyl-, 1'- and 2'-(p-chlorophenyl)-, 1'- and 2'-(p-methoxyphenyl)-, and 1'- and 2'-benzyl-20-ethylenedioxy-9α,11β-dichloro - 16α,17α,21 - trihydroxy-5α-pregnano-[3,2-c]pyrazoles.

A 111.5 mg. sample of 20-ethylenedioxy-9α,11β-dichloro - 16α,17α,21 - trihydroxy-2-hydroxymethylene-5α-pregnane-3-one, and/or the formate esters thereof, is suspended in 2.5 ml. of ethanol and treated with 24.5 mg. of sodium acetate, followed by the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum. It is redissolved in 12 ml. of methanol and 2.0 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 9α,11β-dichloro-2'-(p-fluorophenyl)-20-ethylenedioxy-16α,17α,21-trihydroxy-5α-pregnano-[3,2-c]pyrazole.

A mixture of 1'-(p-fluorophenyl)- and 2'-(p-fluorophenyl) - 9α,11β - dichloro-20-ethylenedioxy-16α,17α,21-trihydroxy-5α-pregnano-[3,2-c]pyrazole is prepared by the following route: A mixture of 1 gram of 9α,11β-dichloro - 20 - ethylenedioxy - 16α,17α,21-trihydroxy-2-hydroxymethylene-5α-pregnane-3-one, and/or the formate esters thereof, 200 ml. of methanol and 200 mg. of p-toluenesulfonic acid is left at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 9α,11β - dichloro - 20-ethylenedioxy-16α,17α,21-trihydroxy-2-methoxymethylene-5α-pregnane-3,11 - dione is obtained by chromatography on acid washed alumina and elution with ether:chloroform mixtures.

A mixture of 500 mg. of the 2-methoxymethylene-derivative, 100 ml. of ethanol, and 1 ml. of p-fluorophenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl) and 2'-(p-fluorophenyl)-9α,11β-dichloro-20 - ethylenedioxy - 16α,17α,21-trihydroxy-5α-pregnano-[3,2-c]pyrazole.

A mixture of 2.9 grams of 9α,11β-dichloro-20-ethylenedioxy-16α,17α,21-trihydroxy-5α - pregnano - [3,2 - c]pyrazole, 100 ml. of methanol, and 6 ml. of a solution prepared by diluting 8 ml. of sulfuric acid with 100 ml. of water is refluxed for one hour and then concentrated under vacuum. The product is extracted with ethyl acetate and the extract is washed with aqueous sodium bicarbonate, salt, and then water. The mixture is dried over magnesium sulfate and then taken to dryness to give 9α, 11β - dichloro - 16α,17α,21 - trihydroxy - 20 - oxo - 5α-pregnano-[3,2-c]pyrazole.

The 9α,11β-dichloro-16α,17α,21-trihydroxy-20-oxo-5α-pregnano-[3,2-c]pyrazole (100 mg.) is heated for 3 minutes with 10 ml. of acetone to which 1 drop of concentrated hydrochloric acid has been added and then letting stand at room temperature for 24 hours. The mixture is then poured into a dilute sodium bicarbonate solution and extracted with ethyl acetate. The extracts are washed, dried over magnesium sulfate and taken to dryness to give the 9α,11β-dichloro-21-hydroxy-16α,17α-isopropylidenedioxy-20-oxo-5α-pregnano-[3,2-c]pyrazole.

In accordance with the above procedure, but starting with an N-alkyl-, N-cycloalkyl-, N-aryl-, or N-aralkyl-9α,11β - dichloro - 16α,17α,21 - trihydroxy - 20 - oxo - 5α-pregnano-[3,2-c]pyrazole, there is obtained the corresponding N-alkyl-, N-cycloalkyl-, N-aryl- or N-aralkyl-9α,11β - dichloro - 21 - hydroxy - 16α,17α - isopropylidenedioxy-20-oxo-5α-pregnano-[3,2-c]pyrazole.

In accordance with the above procedure, but using an equivalent quantity of another ketone such as acetophenone, there is obtained the corresponding 16α,17α-ketal.

*Example 4*

The 21-acyl-derivatives of the 11β,21-dihydroxy-16α,17α - isopropylidenedioxy - 20 - oxo - 5α - pregnano-[3,2-c]pyrazole are prepared according to the method outlined in Flow Sheet D, using the following procedures which are particularly described with reference to the 6α,9α-difluoro-derivative, but are generally applicable to all the N-unsubstituted pyrazoles defined by compounds 13A and 13B of Flow Sheet A and compounds 21A and 21B of Flow Sheet B.

To a solution of 100 mg. of 6α,9α-difluoro-11β,21-dihydroxy - 16α,17α - isopropylidenedioxy - 20 - oxo - 5α-pregnano-[3,2-c]pyrazole in 2 ml. of pyridine is added 2 ml. of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid, saturated aqueous sodium bicarbonate and water (until the aqueous layer is neutral). The ethyl acetate solution is dried with anhydrous sodium sulfate. The solvent is then distilled at about 40° C. under vacuum, to afford the N-acetyl-6α,9α-difluoro-11β,21-dihydroxy -16α,17α - isopropylidenedioxy - 20 - oxo - 5α-pregnano-[3,2-c]pyrazole 21-acetate which is isolated by the addition of water and filtration.

In accordance with the above procedures but using an equivalent quantity of another acylating agent in place of acetic anhydride, there is obtained the corresponding acyl derivatives.

A solution of 5.73 g. of N-acetyl-6α,9α-difluoro-11β,21-dihydroxy - 16α,17α - isopropylidenedioxy - 20 - oxo - 5α-pregnano-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness under vacuum. This residue is dissolved in 150 ml. of acetone containing 2 ml. of 70% perchloric acid. After thirty minutes, aqueous sodium bicarbonate is added and the acetone is removed under vacuum. The product is extracted into chloroform which is washed with water, dried and removed to yield, after chromatography on neutral alumina, 6α,9α - difluoro - 11β,21 - dihydroxy - 16α,17α - isopropylidenedioxy-20-oxo-5α-pregnano - [3,2-c]pyrazole 21-acetate.

*Example 5*

The N-acyl-derivatives of the 11β,21-dihydroxy-16α,17α - isopropylidenedioxy - 20 - oxo - 5α - pregnano - [3,2-c]pyrazoles are prepared according to the method outlined in Flow Sheet D, using the following procedures which are particularly described with reference to the 6α,9α-difluoro-derivative, but are generally applicable to all the N-unsubstituted pyrazole compounds defined by compounds 14A and 14B of Flow Sheet A and compounds 20A and 20B of Flow Sheet B.

6α,9α - difluoro - 11β,21 - dihydroxy - 16α,17α - isopropylidenedioxy - 20 - oxo-5α-pregnano-[3,2c]pyrazole (500 mg.) is suspended in 25 ml. of 2,3-dihydropyran. A few drops of concentrated hydrochloric acid are added and magnetic stirring is continued for 6 hours, whereupon the solution is concentrated under vacuum. The residue is triturated with petroleum ether and recrystallized from a mixture of methylene chloride and petroleum ether or a mixture of ether and petroleum ether, to afford the 6α,9α - difluoro-11β - hydroxy - 21 - tetrahydropyranyloxy-16α,17α - isopropylidenedioxy - 20 - oxo - 5α - pregnano-[3,2-c]pyrazole.

To a solution of 100 mg. of 6α,9α-difluoro-21-tetrahydropyranyloxy-11β-hydroxy - 16α,17α-isopropylidenedioxy-20-oxo-5α - pregnano - [3,2-c]pyrazole in 2 ml. of pyridine is added 2 ml. of acetic anhydride. The mixture is allowed to stand overnight at room temperature. It is taken to dryness under vacuum to afford the N-acetyl-6α,9α-difluoro - 21 - tetrahydropyranyloxy-11β-hydroxy-16α,17α-isopropylidenedioxy - 20 - oxo-5α-pregnano-[3,2-c]pyrazole.

Without further purification, this substance is dissolved in 5 ml. of methanol containing 20 mg. of p-toluenesulfonic acid. The mixture is kept at room temperature for 4 hours. The solvent is removed under vacuum, ethyl acetate is added and the organic layer is washed several times with dilute sodium bicarbonate. The dried solvent is removed to yield, after chromatography on neutral alumina, N-acetyl-6α,9α-difluoro-11β,21-dihydroxy-16α,17α-isopropylidenedioxy-20-oxo-5α-pregnano-[3,2-c]pyrazole.

*Example 6*

The following procedures which relate to Flow Sheet E are particularly described, starting with the 6α,9α-difluoro-11β,21-dihydroxy - 16α,17α - isopropylidenedioxy-20-oxo-5α-pregnano-[3,2-c]pyrazole but are generally applicable to all the N-unsubstituted pyrazole compounds defined by compounds 13A and 13B of Flow Sheet A, compounds 21A and 21B of Flow Sheet B, compounds 35A and 36B of Flow Sheet C and compounds 40A and 40B of Flow Sheet D. When the N-substituted-derivatives are employed, the first step of forming the N-carbamyl-derivative and the last step of removal of the N-carbamyl-group is omitted.

To a solution of 3.70 g. of 6α,9α-difluoro-17α,21-dihydroxy-16α,17α-isopropylidenedioxy - 20 - oxo-5α-pregnano-[3,2-c]pyrazole in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl pyrazole in sufficient purity for the next step.

To a solution of 85 mg. of N-carbamyl-6α,9α-difluoro-11β,21-dihydroxy - 16α,17α - isopropylidenedioxy-20-oxo-5α-pregnano-[3,2-c]pyrazole in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, dried and removed to give N-carbamyl - 6α,9α - difluoro-11β,21-dihydroxy-16α,17α-isopropylidenedioxy - 20 - oxo-5α-pregnano-[3,2-c]pyrazole 21-mesylate.

To 180 mg. of N-carbamyl-6α,9α-difluoro-11β,21-dihydroxy-16α,17α-isopropylidenedioxy - 20 - oxo-5α-pregnano-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords N-carbamyl-6α,9α-difluoro-11β-hydroxy-21-iodo-16α,17α-isopropylidenedioxy - 20 - oxo-5α-pregnano-[3,2-c]pyrazole.

The N - carbamyl-6α,9α-difluoro-11β-hydroxy-21-iodo-16α,17α-isopropylidenedioxy - 20 - oxo-5α-pregnano-[3,2-c]pyrazole (100 mg.) is dissolved in a mixture of 5 ml.

of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate under vacuum, the residue is left overnight under nitrogen in 5 ml. of methanol and 1 ml. of one molar sodium methoxide in methanol. The solvent is then removed under vacuum, ethyl acetate is added and, after a water wash, the solvent is dried and removed. Chromatography of the residue on neutral alumina affords some N-carbamyl-6α,9α-difluoro-11β - hydroxy-16α,17α-isopropylidenedioxy-20-oxo-5α-pregnano-[3,2-c]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-6α,9α - difluoro - 11β-hydroxy-21-iodo-16α,17α-isopropylidenedioxy - 20-oxo-5α-pregnano-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamyl-6α,9α-difluoro-11β-hydroxy-16α,17α-isopropylidenedioxy - 20 - oxo-5α-pregnano-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 62 mg. of N-carbamyl-6α,9α-difluoro-11β,21-dihydroxy-16α,17α - isopropylidenedioxy-20-oxo-5α-pregnano-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy-6α,9α-difluoro-11β-hydroxy-20-oxo-5α - pregnano-[3,2-c]pyrazole and N-carbamyl - 6α,9α,21 - trifluoro-11β,17α-dihydroxy-20-oxo-5α-pregnano-[3,2-c]pyrazole, which compounds are separated by partition chromatography, or by chromatography on silica gel.

A mixture of N-carbamyl-6α,9α-difluoro-11β,21-dihydroxy-16α,17α-isopropylidenedioxy-20-oxo-5α - pregnano-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-21-chloro-6α,9α - difluoro-11β,21-dihydroxy-16α,17α-isopropylidenedioxy - 20-oxo-5α-pregnano-[3,2-c]pyrazole.

To a solution of 355 mg. of N-carbamyl-6α,9α-difluoro-11β-hydroxy - 16α,17α - isopropylidenedioxy-20-oxo-5α-pregnano-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 6α,9α-difluoro-11β-hydroxy-16α,17α-isopropylidenedioxy-20-oxo-5α-pregnano-[3,2-c]pyrazole.

In accordance with the above procedure but starting with the N-carbamyl-6α,9α,21-trifluoro-, or the 21-chloro-6α,9α-difluoro-11β-hydroxy - 16α,17α - isopropylidenedioxy-20-oxo-5α-pregnano-[3,2-c]pyrazole the corresponding 6α,9α-21-trifluoro or the 21-chloro-6α,9α-difluoro-11β-hydroxy - 16α,17α - isopropylidenedioxy-20-oxo-5α-pregnano-[3,2-c]pyrazole is obtained.

6α,9α-difluoro-11β-hydroxy - 16α,17α - isopropylidenedioxy-20-oxo-5α - pregnano - [3,2-c]pyrazole (1.5 g.) is added to 150 ml. of refluxing 60% formic acid. After twenty minutes, the solution is cooled and then poured into ice and water. After 18 hours, the 6α,9α-difluoro-11β,16α,17α-trihydroxy-20-oxo-5α-pregnano-[3,2-c]pyrazole is collected by filtration and dried.

*Example 7*

In order to remove any formate esters which may be formed during the preparation of the 2-hydroxymethylene-derivative by reaction of the steroid with ethyl formate and sodium hydride the following procedure is employed.

The steroid (4 g.) is refluxed for about 2 hours under nitrogen with 60 cc. of a mixture of 1.8 g. of potassium hydroxide in 100 ml. of ethanol. The ethanol is taken off under reduced pressure. About 75 cc. of methylene chloride and 25 cc. of saturated sodium chloride solution are added and the product is then washed with saturated sodium chloride until neutral. The steroid product containing the free hydroxyl group is then dried over magnesium sulfate and taken to dryness.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of 6α - fluoro - 11β,16α,17α,21-tetrahydroxy-20-oxo-5α-pregnano-[3,2-c]pyrazole and the 16α,17α-acetonide thereof.
2. A compound selected from the group consisting of 6α - fluoro-11β,16α,17α,21-tetrahydroxy-20-oxo-2'-phenyl-5α - pregnano[3,2-c]pyrazole and the 16α,17α-acetonide thereof.
3. A compound selected from the group consisting of 6α - fluoro - 11β,16α,17α,21 - tetrahydroxy - 20-oxo-2'-(p-fluorophenyl)-5α-pregnano-[3,2-c]pyrazole and the 16α,17α-acetonide thereof.
4. A compound selected from the group consisting of 11β,16α17α,21 - tetrahydroxy-6α-methyl-20-oxo-5α-pregnano-[3,2-c]pyrazole and the 16α,17α-acetonide thereof.
5. A compound selected from the group consisting of 11β,16α,17α,21-tetrahydroxy-6α-methyl-20-oxo-2'-phenyl-5α-pregnano-[3,2-c]pyrazole and the 16α,17α-acetonide thereof.
6. A compound selected from the group consisting of 11β,16α,17α,21 - tetrahydroxy-6α-methyl-20-oxo-2'-(p-fluorophenyl)-5α-pregnano-[3,2-c]pyrazole and the 16α,17α-acetonide thereof.

7. A compound selected from the group consisting of 6α,9α - difluoro - 11β,16α,17α,21-tetrahydroxy-20-oxo-5α-pregnano-[3,2-c]pyrazole and the 16α,17α-acetonide thereof.

8. A compound selected from the group consisting of 6α,9α - difluoro - 11β,16α,17α,21 - tetrahydroxy-20-oxo-2'-phenyl - 5α - pregnano-[3,2-c]pyrazole and the 16α,17α-acetonide thereof.

9. A compound selected from the group consisting of 6α,9α - difluoro - 11β,16α,17α,21-tetrahydroxy-20-oxo-2'-(p - fluorophenyl) - 5α-pregnano-[3,2-c]pyrazole and the 16α,17α-acetonide thereof.

10. A compound selected from the group consisting of 9α - fluoro - 11β,16α,17α,21-tetrahydroxy-20-oxo-5α-pregnano-[3,2-c]pyrazole and the 16α,17α-acetonide thereof.

11. A compound selected from the group consisting of 9α - fluoro-11β,16α,17α,21-tetrahydroxy-20-oxo-2'-phenyl-5α-pregnano-[3,2-c]pyrazole and the 16α,17α-acetonide thereof.

12. A compound selected from the group consisting of 9α - fluoro - 11β,16α,17α,21 - tetrahydroxy - 20-oxo-2'-(p-fluorophenyl)-5α-pregnano-[3,2-c]pyrazole and the 16α,17α-acetonide thereof.

13. A compound selected from the group consisting of 21 - chloro - 11β,16α,17α-trihydroxy-20-oxo-2'-phenyl-5α-pregnano-[3,2-c]pyrazole and the 16α,17α-acetonide thereof.

14. A compound selected from the group consisting of 21 - chloro - 11β,16α,17α-trihydroxy-20-oxo-2'-(p-fluorophenyl)-5α-pregnano-[3,2-c]pyrazole and the 16α,17α-acetonide thereof.

15. A compound selected from the group consisting of 9α,11β - dichloro - 16α,17α,21-trihydroxy-20-oxo-5α-pregnano-[3,2-c]pyrazole and the 16α,17α-acetonide thereof.

References Cited by the Examiner

UNITED STATES PATENTS 2,945,852    7/1960    Bergstrom _____ 260—239.5

LEWIS GOTTS, *Primary Examiner.*